United States Patent
Shemer et al.

(10) Patent No.: US 12,001,303 B2
(45) Date of Patent: Jun. 4, 2024

(54) DATA CENTER RESTORATION AND MIGRATION

(71) Applicant: EMC IP Holding Company LLC, Hopkinton, MA (US)

(72) Inventors: Jehuda Shemer, Kfar Saba (IL); Valerie Lotosh, Ramat-Gan (IL); Erez Sharvit, Ramat-Gan (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 225 days.

(21) Appl. No.: 17/507,661

(22) Filed: Oct. 21, 2021

(65) Prior Publication Data
US 2023/0128370 A1    Apr. 27, 2023

(51) Int. Cl.
G06F 11/00    (2006.01)
G06F 9/455    (2018.01)
G06F 11/14    (2006.01)
G06F 11/20    (2006.01)

(52) U.S. Cl.
CPC ........ G06F 11/203 (2013.01); G06F 9/45558 (2013.01); G06F 11/1464 (2013.01); G06F 11/1482 (2013.01); G06F 2009/4557 (2013.01); G06F 2009/45579 (2013.01); G06F 2009/45595 (2013.01)

(58) Field of Classification Search
CPC ............ G06F 9/45558; G06F 11/1482; G06F 11/1464; G06F 11/203; G06F 2009/4557; G06F 2009/45579; G06F 2009/45595
USPC ....................................................... 714/1–57
See application file for complete search history.

(56) References Cited

U.S. PATENT DOCUMENTS

| | | | | |
|---|---|---|---|---|
| 2003/0028729 A1* | 2/2003 | Yamamoto | ............. | G06F 3/065 711/6 |
| 2003/0126327 A1* | 7/2003 | Pesola | .................. | G06F 3/0601 711/112 |
| 2005/0193245 A1* | 9/2005 | Hayden | ............... | G06F 11/2069 714/13 |
| 2009/0172816 A1* | 7/2009 | Maino | ................... | G06F 21/566 726/24 |
| 2010/0049823 A1* | 2/2010 | Saigo | .................. | G06F 11/2071 709/216 |
| 2012/0192006 A1* | 7/2012 | Qi | ....................... | G06F 11/2071 714/E11.089 |
| 2014/0215272 A1* | 7/2014 | Bauer | ................. | G06F 11/2023 714/37 |
| 2015/0074447 A1* | 3/2015 | Park | .................... | G06F 11/2028 714/4.11 |

(Continued)

*Primary Examiner* — Sarai E Butler
(74) *Attorney, Agent, or Firm* — Amin, Turocy & Watson, LLP

(57) ABSTRACT

A system can maintain a first data center that comprises a virtualized overlay network and virtualized volume identifiers. The system can determine to perform a restore of data of the first data center to a second data center, the data comprising first instances of virtualized workloads. The system can transfer the data to the second data center. The system can configure the second data center with the virtualized overlay network and the virtualized volume identifiers. The system can operate the virtualized workloads on the second data center, the second instances of the virtualized workloads invoking the second instance of the virtualized overlay network and the second instance of the virtualized volume identifiers.

20 Claims, 12 Drawing Sheets

(56) References Cited

U.S. PATENT DOCUMENTS

| | | | | |
|---|---|---|---|---|
| 2015/0169417 A1* | 6/2015 | Brandwine | ......... | H04L 61/2503 |
| | | | | 714/4.11 |
| 2015/0331753 A1* | 11/2015 | Nakajima | ........... | G06F 11/2071 |
| | | | | 714/15 |
| 2015/0347221 A1* | 12/2015 | Anderson | ............. | G06F 9/5072 |
| | | | | 714/4.1 |
| 2016/0062858 A1* | 3/2016 | Gallagher | ............ | G06F 11/2038 |
| | | | | 714/6.23 |
| 2016/0119202 A1* | 4/2016 | Iyer | .................... | G06F 11/0751 |
| | | | | 709/224 |
| 2019/0243725 A1* | 8/2019 | Bade | ................... | G06F 11/2025 |
| 2021/0342237 A1* | 11/2021 | Polimera | ............ | G06F 9/45558 |
| 2022/0229685 A1* | 7/2022 | Helvey | ............... | G06F 9/45558 |
| 2023/0125085 A1 | 4/2023 | Shemer et al. | | |
| 2023/0127061 A1 | 4/2023 | Shemer et al. | | |
| 2023/0130897 A1 | 4/2023 | Shemer et al. | | |

* cited by examiner

900

(902)

↓

DETERMINING TO TRANSFER DATA OF A FIRST DATA CENTER TO A SECOND DATA CENTER, WHEREIN THE DATA COMPRISES FIRST INSTANCES OF A GROUP OF VIRTUALIZED WORKLOADS THAT OPERATE ON THE FIRST DATA CENTER, AND WHEREIN THE FIRST DATA CENTER COMPRISES A FIRST INSTANCE OF A VIRTUALIZED OVERLAY NETWORK THAT ABSTRACTS PHYSICAL NETWORK RESOURCES AND A FIRST INSTANCE OF A GROUP OF VIRTUALIZED VOLUME IDENTIFIERS THAT ABSTRACT PHYSICAL STORAGE VOLUMES 904

↓

TRANSFERRING THE DATA TO THE SECOND DATA CENTER 906

↓

CONFIGURING THE SECOND DATA CENTER WITH A SECOND INSTANCE OF THE VIRTUALIZED OVERLAY NETWORK AND A SECOND INSTANCE OF THE GROUP OF VIRTUALIZED VOLUME IDENTIFIERS 908

↓

OPERATING SECOND INSTANCES OF THE GROUP OF VIRTUALIZED WORKLOADS ON THE SECOND DATA CENTER, THE SECOND INSTANCES OF THE GROUP OF VIRTUALIZED WORKLOADS INVOKING THE SECOND INSTANCE OF THE VIRTUALIZED OVERLAY NETWORK AND THE SECOND INSTANCE OF THE GROUP OF VIRTUALIZED VOLUME IDENTIFIERS 910

IDENTIFYING, IN A CLOUD PLATFORM THAT STORES INFORMATION ABOUT A FIRST OVERLAY NETWORK AND A FIRST STORAGE VIRTUALIZATION, FIRST INFORMATION ABOUT THE FIRST OVERLAY NETWORK AND THE FIRST STORAGE VIRTUALIZATION THAT CORRESPONDS TO A FIRST POINT IN TIME 1104

UTILIZING THE FIRST INFORMATION ABOUT THE FIRST OVERLAY NETWORK AND THE FIRST STORAGE VIRTUALIZATION THAT CORRESPONDS TO THE FIRST POINT IN TIME TO CONFIGURE A SECOND DATA CENTER 1006

DATA CENTER RESTORATION AND MIGRATION

BACKGROUND

A data center can comprise a plurality of computers that are configured to store and/or operate on data. Managing a data center can comprise various operations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a first data center that comprises a first instance of a virtualized overlay network that virtualizes physical network resources and a first instance of a group of virtualized volume identifiers that virtualize physical storage volumes. The system can determine to perform a restore of data of the first data center to a second data center, the data comprising first instances of a group of virtualized workloads that operate on the first data center. The system can transfer the data to the second data center. The system can configure the second data center with a second instance of the virtualized overlay network and a second instance of the group of virtualized volume identifiers. The system can operate second instances of the group of virtualized workloads on the second data center, the second instances of the group of virtualized workloads invoking the second instance of the virtualized overlay network and the second instance of the group of virtualized volume identifiers.

An example method can comprise determining, by a system comprising a processor, to transfer data of a first data center to a second data center, wherein the data comprises first instances of a group of virtualized workloads that operate on the first data center, and wherein the first data center comprises a first instance of a virtualized overlay network that abstracts physical network resources and a first instance of a group of virtualized volume identifiers that abstract physical storage volumes. The method can further comprise transferring, by the system, the data to the second data center. The method can further comprise configuring, by the system, the second data center with a second instance of the virtualized overlay network and a second instance of the group of virtualized volume identifiers. The method can further comprise operating, by the system, second instances of the group of virtualized workloads on the second data center, the second instances of the group of virtualized workloads invoking the second instance of the virtualized overlay network and the second instance of the group of virtualized volume identifiers.

An example non-transitory computer-readable medium can comprise instructions that, in response to execution, cause a system comprising a processor to perform operations. The operations can comprise determining to transfer data of a first data center to a second data center, wherein the first data center comprises a first overlay network that presents an overlay and a first storage virtualization that presents virtual storage. The operations can further comprise transferring the data to the second data center. The operations can further comprise configuring the second data center with a second overlay network that presents the overlay and a second storage virtualization that presents the virtual storage. The operations can further comprise operating virtualized workloads from the first data center on the second data center, wherein the virtualized workloads utilize the second overlay network and the second storage virtualization.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates another example process flow that can facilitate data center restoration and migration, in accordance with an embodiment of this disclosure;

FIG. 11 illustrates an example process flow for restoring to a point in time, and that can facilitate data center restoration and migration, in accordance with an embodiment of this disclosure;

DETAILED DESCRIPTION

Example Architectures

Figure 1:
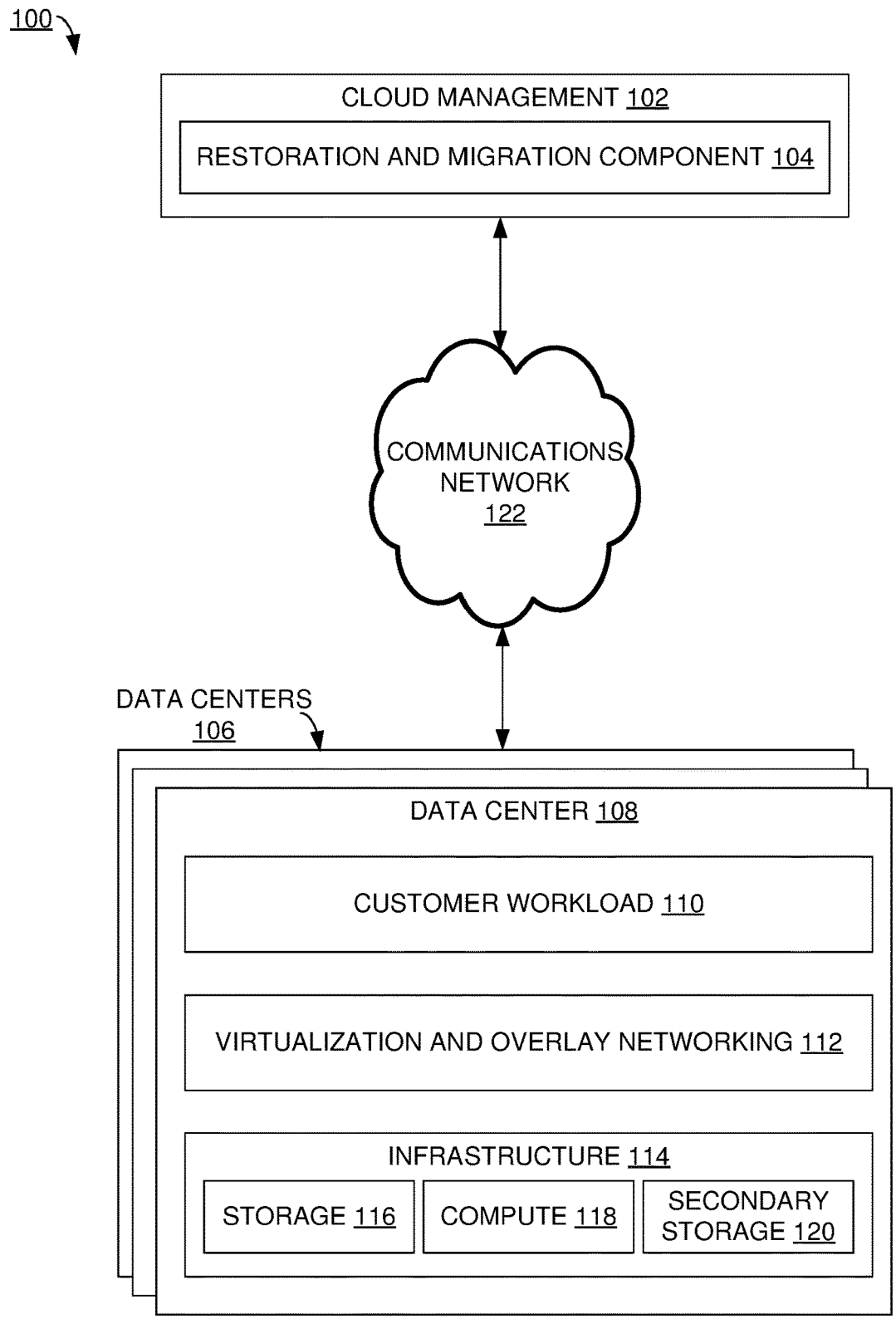
FIG. 1 illustrates an example system architecture that can facilitate data center restoration and migration, in accordance with an embodiment of this disclosure.

FIG. 1 illustrates an example system architecture 100 that can facilitate data center restoration and migration, in accordance with an embodiment of this disclosure.

System architecture 100 can facilitate deployment and management of infrastructure at customer premise or hosted locations. System architecture 100 can facilitate consuming infrastructure as a service. System architecture 100 generally targets full data center deployments (e.g., data centers 106, in an architecture that can be referred to as data centers as a service (DCaaS)). System architecture 100 can comprise data centers that run virtual infrastructure (e.g., customer workload 110 operating on top of virtualization and overlay networking 112) and can facilitate data protection and mobility use of those data centers.

A data center (e.g., data center 108) in system architecture 100 can comprise compute (e.g., compute 118), storage (e.g., storage 116), and networking, and which has a virtualization layer (e.g., virtualization and overlay networking 112). That is, system architecture 100 can deploy a data center that can run infrastructure as a service (IaaS) workloads. Where system architecture 100 deploys infrastructure as a service, this can be referred to as IaaS as a service (IaaSaaS).

System architecture 100 can differ from other cloud offerings. Some other cloud offerings support creating extensions of themselves, which can be hosted in other locations. In the example of system architecture 100, cloud management 102 can be used to orchestrate and manage a completely independent customer data center (e.g., data center 108). The manner in which technologies are used, and the way that layers (e.g., infrastructure 114 and virtualization and overlay networking 112) can be decomposed in system architecture 100 can differ from that of other cloud offerings.

That is, in other cloud offerings, such as public clouds (where workloads for multiple customers are run on the same hardware and/or in the same data center), hardware resources can generally be shared between tenants (e.g., customers). This can lead to security concerns because one customer can be sharing hardware with a rival entity (e.g., two competing consumer packaged goods companies) or a malicious actor. A security hole or data leak can cause immediate damage. In contrast, with system architecture 100, a small deployment can be created that is dedicated to a customer and data can be stored on customer premises or stored in a dedicated area for the customer.

In other cloud offerings, management can be optimized for a small number of large hardware locations. Other cloud offerings can rely on uniformity and consistency of hardware and access in order to optimize their maintenance. In contrast, system architecture 100 can be used to manage a larger number of customer locations, each with a relatively small deployment. With system architecture 100, there can be differences in hardware between customer locations according to an age and/or version of deployment, or according to a price or service level agreement designation. The management issues associated with these two types of architectures can be different.

Cloud extensions can be additional hardware from a same cloud region located in a different physical place. In system architecture 100, each location can be a separate instance, which can be connected and/or extended by utilizing the present techniques.

System architecture 100 can be utilized to connect to existing customer data center components, whereas with other cloud offerings this can constitute a security violation.

System architecture 100 can be implemented to deploy or utilize hardware of a wide range of profiles and capabilities. This hardware can include one or more servers (e.g., compute 118) with a central processing unit, memory, local storage, and peripheral devices; one or more primary storage systems (e.g., storage 116, where primary storage can generally be optimized for performance (e.g., provide a low latency for reads and writes), and be used for running an organization's main applications and workloads); network switches and devices (e.g., network and/or a storage area network (SAN); and/or additional hardware for secondary storages (e.g., secondary storage 120, where, in contrast to primary storage, secondary storage can generally be optimized for long term reliability and capacity, and used for backup and data protection systems) or other services. This hardware can also include object storage, file systems, network attached storage (NAS), hardware for performance acceleration (e.g., graphics processing units (GPUs), cache cards, central processing unit (CPU) offload cards, smart network interface cards (NICs), etc.), and/or specialized servers or other hardware for specific purposes like stream servers, messaging, artificial intelligence (AI), image processing and/or security.

In some examples, this hardware can be configured and wired by an entity that manages cloud management 102, and on behalf of a customer that possesses data center 108. The hardware can be delivered to data center 108, or can be hosted by the entity that manages cloud management 102, or by a third party. In some examples, in hosting sites, general hardware can already be available at the time of a customer order, and be allocated to a customer upon a service request.

In addition to hardware, multiple software components can be deployed and managed in accordance with customer requests.

Cloud management 102 can comprise a cloud portal that provides a purchasing and management user interface, and that facilitates ordering hardware resources; managing resource usage; monitoring and error handling; and upgrade and life cycle.

Cloud management 102 can store customer-related information and details pertaining to customer infrastructure (e.g., an architecture of data center 108).

In system architecture 100, deployed infrastructure (e.g., deployed infrastructure of data center 108) can be managed by cloud management 102, and in some examples, a customer can be billed according to the resources that the customer utilizes (which can be referred to as, pay as you go). In such examples, the customer can avoid allocating an information technology (IT) team to manage the infrastructure.

In some examples, system architecture 100 involves deploying a full data center (e.g., data center 108), where the data center is entirely managed by cloud management 102, and where the data center is targeted for a virtualized workload.

That is, system architecture 100 can involve a DCaaS where the data center is under cloud management 102 management (e.g., the customer does not provide infrastructure). Virtualized infrastructure (e.g., virtualization and overlay networking 112) can comprise a hypervisor on which the customer allocates virtual workloads (e.g., customer workload 110), which can be an IaaS implementation. That is, a full IaaS data center can be deployed as a service, and referred to as IaaSaaS.

Given those considerations, system architecture 100 can deploy an IaaS data center as a service. System architecture 100 can target a data center that is optimized for virtualized workloads on customer premises or a hosting facility. The customer can provide high-level resource definitions (e.g., intent-based provisioning) and service level agreements (SLAs) for a data center to cloud management 102. From this information, cloud management 102 can derive a data center hardware definition. Hardware corresponding to this hardware definition can be shipped to customer premise, or shipped to or allocated on a hosting site. When the hardware is shipped and ready, cloud management 102 can configure the hardware and networking, and then deploy and configure a virtualization stack on the hardware. In some examples, the hardware can be shipped, wired, deployed, and then configured. In other examples, the hardware can be pre-wired, pre-deployed, pre-configured, and then shipped. For example, one or more racks of hardware can be wired and connected, have a stack deployed on the hardware, and then the racks of hardware can be shipped. Once the racks of hardware are received at a destination, they can be connected to power and an external network and begin operations.

A data center can comprise storage (e.g., storage 116). A data center can also comprise compute (e.g., compute 118), which can comprise servers that lack (or do not utilize) local storage and are configured to boot from and store their data to storage 116. Booting can be implemented via technologies such as a preboot execution environment (PXE) book, or a network boot. The devices that the compute boots from can be configured by cloud management 102 as part of hardware and networking configuration. A data center can also comprise secondary storage (e.g., secondary storage 120). In some examples, there can be multiple instances of each of these components, and multiple different hardware models of each component can be deployed within a data center.

In some examples, local storage can be omitted from compute servers to facilitate maintenance. In such a system architecture, server hardware can be added or replaced and booted from the storage, without maintaining data on the server itself. Additionally, using a common boot device for virtual infrastructure can facilitate easier upgrades and configuration. Then, data protection can be facilitated by using such a system architecture.

Virtualization and overlay networking 112 can comprise the following to support data protection and mobility use cases. Virtualization and overlay networking 112 can comprise virtualized overlay networking (which virtualizes underlying network resources to components that operate on top of the virtual overlay network), and storage that is configured to spoof or virtualize volume identifiers (such as world wide names (WWNs)).

Where cloud management 102 manages the deployment and configuration of a data center, cloud management 102 can have information about the data center and the customer that cloud management 102 can use to manage the data center. This information can include customer infrastructure services information; ordered, deployed, and in-use resources; a customer's physical location; and customer SLAs.

System architecture 100 comprises cloud management 102, data centers 106, and communications network 122.

In turn, cloud management 102 comprises restoration and migration component 104. Data centers 106 comprises a plurality of data centers, including data center 108. Data center 108 comprises customer workload 110, virtualization and overlay networking 112, and infrastructure 114. Infrastructure 114 comprises storage 116, compute 118, and secondary storage 120.

Figure 12:
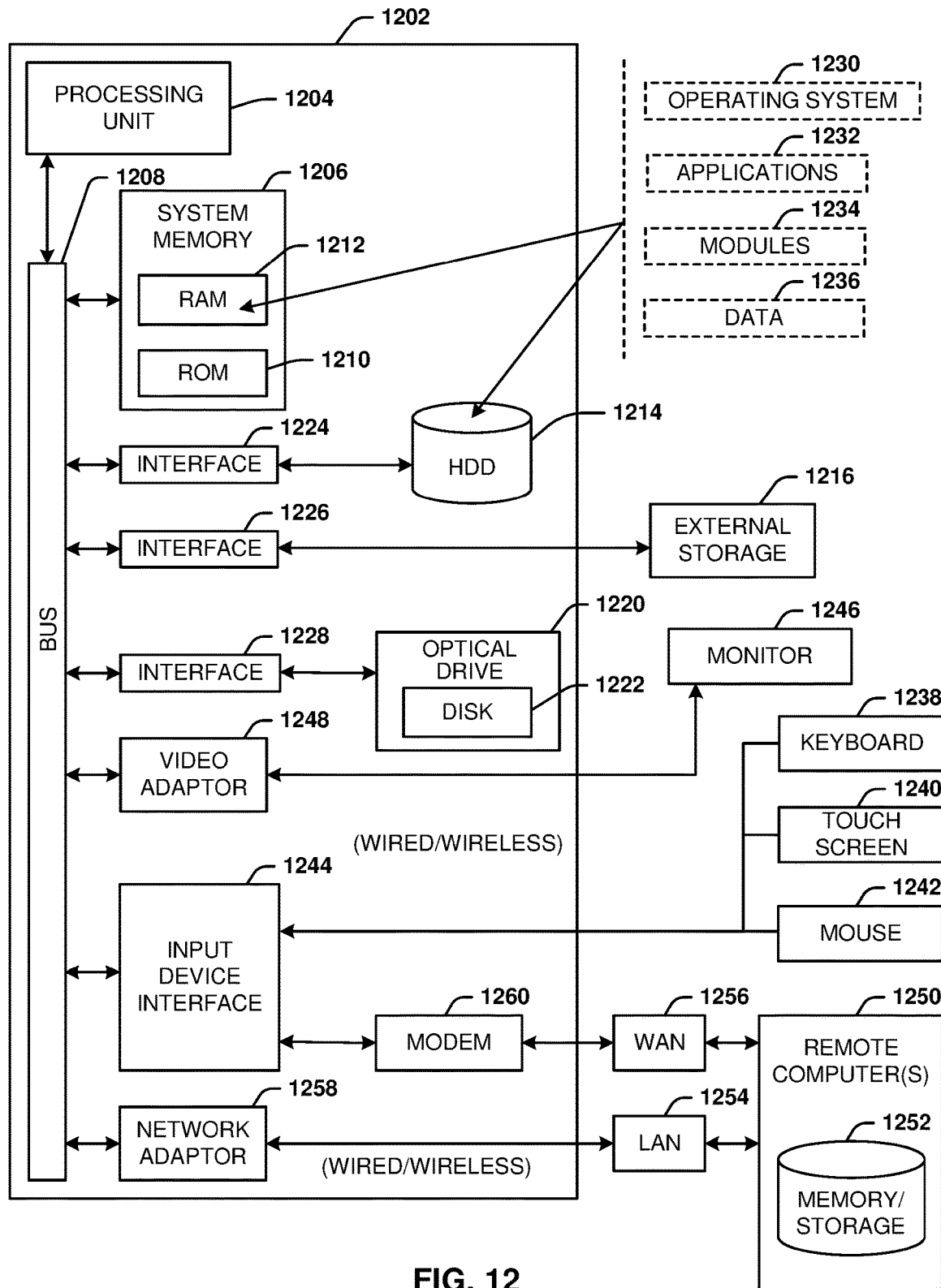
FIG. 12 illustrates an example block diagram of a computer operable to execute an embodiment of this disclosure.

Each of cloud management 102, data centers 106, and data center 108 can be implemented with part(s) of computing environment 1200 of FIG. 12. Communications network 122 can comprise a computer communications network, such as the INTERNET.

Cloud management 102 can communicate with data centers 106 and data center 108 via communications network 122 to manage data centers 106 and data center 108. In managing a data center, cloud management 102 can perform functions such as provisioning and managing virtualization and overlay networking 112, and infrastructure 114, and running customer workload 110 on data center 108.

Restoration and migration component 104 of cloud management 102 can manage data centers 106 and data center 108 by managing a restoration and/or migration of a data center. Restoring and/or migrating a data center can comprise using information about the data center (e.g., how virtualization and overlay networking is set up) and a backup of data of the data center to re-setup that data center (e.g., after the data center has lost power) or to restore the information of that data center to another data center (e.g., another data center of data centers 106). In effectuating data center restoration and migration, restoration and migration component 104 can implement part(s) of the operating procedures of FIGS. 8-11.

Customer workload 110 can comprise workloads provided by a customer of data center 108 that operate on data center 108. Customer workload 110 can comprise a virtualized workload—e.g., a virtual machine on which customer components operate, and where the virtual machine operates on top of virtualization and overlay networking 112.

Virtualization and overlay networking 112 can comprise virtualization management component (e.g., a hypervisor) that supports the execution of customer workload 110. Virtualization and overlay networking 112 can also comprise storage virtualization. In some examples, the virtualization management can comprise management for virtual machine-based virtualization, for container-based virtualization, for other types of virtualization, or for a combination of types of virtualization.

Infrastructure 114 can comprise computer hardware of data center 108. Storage 116 can comprise storage devices upon which computer data can be stored. Compute 118 can comprise one or more servers that process data stored on storage 116. In some examples, compute 118 omits using its own local storage, and instead uses storage 116 for storage. This separation of compute and storage hardware can facilitate managing a data center, as well as restoring a data center. Secondary storage 120 can be similar hardware to storage 116. Where storage 116 is used by compute 118, secondary storage can be used for backup and staging of data, such as to store a snapshot of storage 116, or to store data send from cloud management 102 in the course of managing data center 108.

Figure 2:
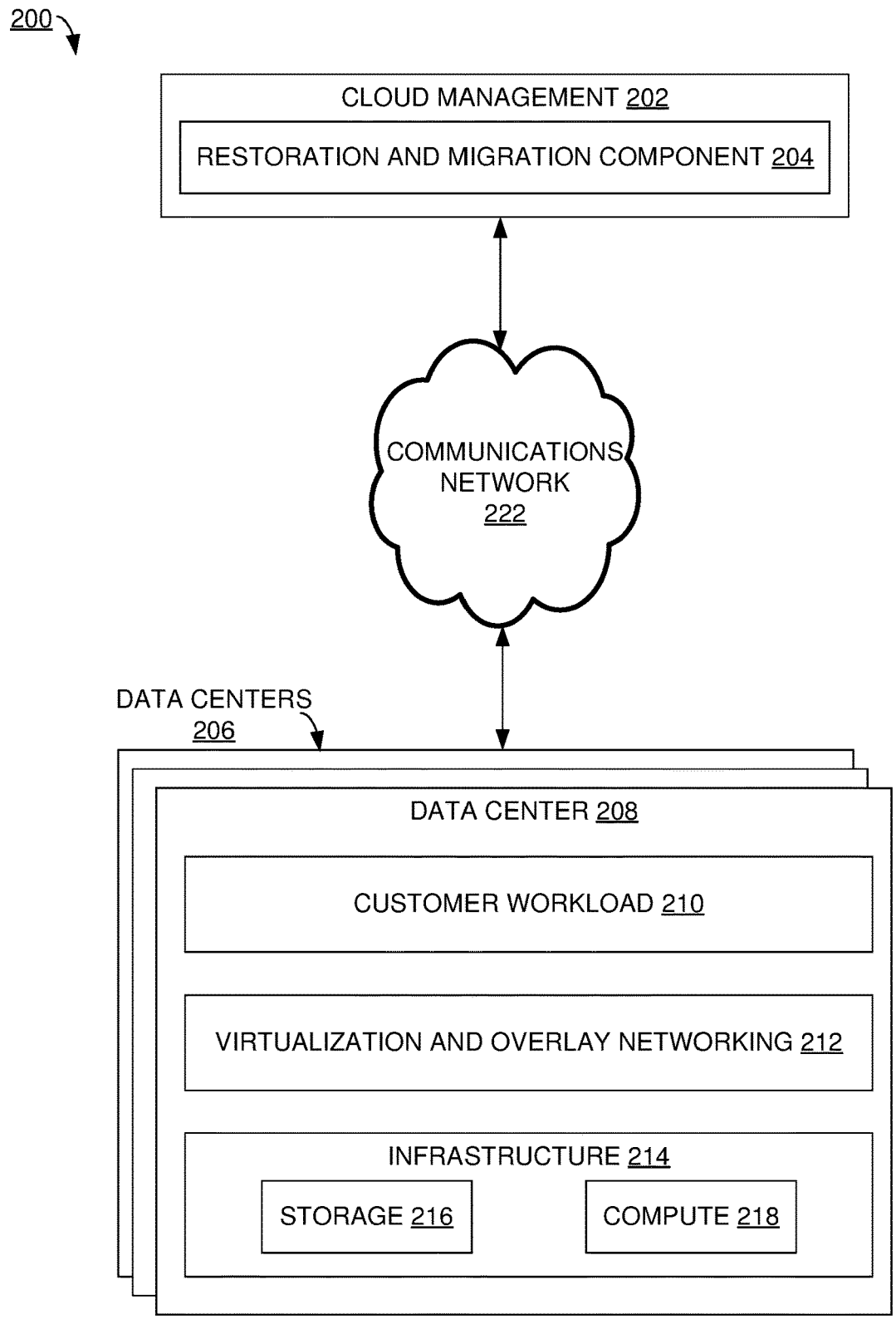
FIG. 2 illustrates another example system architecture that can facilitate data center restoration and migration, in accordance with an embodiment of this disclosure.

FIG. 2 illustrates another example system architecture 200 that can facilitate data center restoration and migration, in accordance with an embodiment of this disclosure.

System architecture 200 comprises cloud management 202, data centers 206, and communications network 222 (which can be similar to cloud management 102, data centers 106, and communications network 122 of FIG. 1, respectively).

In turn, cloud management 202 comprises restoration and migration component 204 (which can be similar to restoration and migration component 104). Data centers 206 comprises a plurality of data centers, including data center 208 (which can be similar to data center 108). Data center 208 comprises customer workload 210, virtualization and overlay networking 212, and infrastructure 214 (which can be similar to customer workload 110, virtualization and overlay networking 112, and infrastructure 114, respectively). Infrastructure 214 comprises storage 216 and compute 218 (which can be similar to storage 116 and compute 118, respectively).

A difference between system architecture 200 and system architecture 100 can be that system architecture 200 lacks secondary storage in data center 208 while system architecture 100 has secondary storage 120 in data center 108. Despite this difference, system architecture 200 and system architecture 100 can still each be implemented to facilitate data center restoration.

Figure 3:
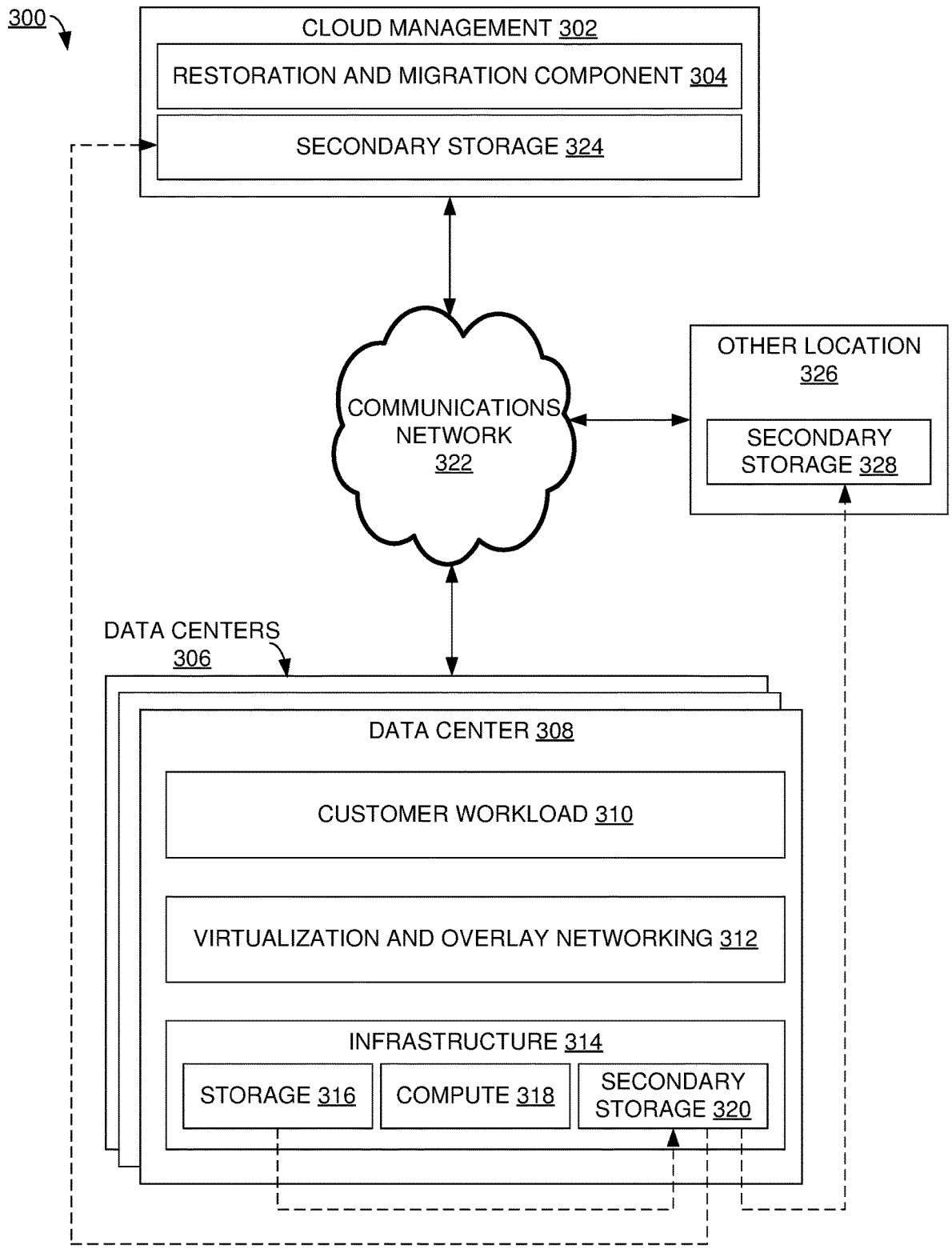
FIG. 3 illustrates an example system architecture that protects data of a data center, and that can facilitate data center restoration and migration, in accordance with an embodiment of this disclosure.

FIG. 3 illustrates an example system architecture 300 that protects data of a data center, and that can facilitate data center restoration and migration, in accordance with an embodiment of this disclosure.

System architecture 300 comprises cloud management 302 (which can be similar to cloud management 102 of FIG. 1), data centers 306 (which can be similar to data centers 106), and communications network 322 (which can be similar to communications network 122).

In turn, cloud management 302 comprises restoration and migration component 304 (which can be similar to restoration and migration component 104) and secondary storage 324 (which can be similar to secondary storage 120, though located on cloud management 302 instead of data center 308). Data centers 306 comprises a plurality of data centers, including data center 308 (which can be similar to data centers 106 and data center 108, respectively). Data center 308 comprises customer workload 310, virtualization and overlay networking 312, and infrastructure 314 (which can be similar to customer workload 310, virtualization and overlay networking 112, and infrastructure 114, respectively). Infrastructure 314 comprises storage 316, compute 318, and secondary storage 320 (which can be similar to storage 116, compute 118, and secondary storage 120, respectively).

Other location 326 can be similar to data center 108, and comprises secondary storage 328, which can be similar to secondary storage 120. Other location 326 can be in a different physical location than data center 308, and can communicate with data center 308 (and cloud management 302) via communications network 322.

In some examples, data center 308 omits secondary storage 320 (similar to system architecture 200 of FIG. 2). In such examples, data protection can be made from storage 316 to secondary storage 324 and/or secondary storage 328 without passing through secondary storage.

Data protection for a data center can be handled by a provider (e.g., cloud management 302), without customer involvement. That is, fully automatic data center protection can be provided for virtual workloads and data, as a service. Data protection can involve both backup and restore operations.

In some example architectures, such as in system architecture 300, data in a data center can be stored on a storage system (e.g., storage 316), including virtual infrastructure configuration. In such examples, protecting a data center (e.g., data center 308) can involve protecting data on the storage, and customer infrastructure information that is managed by the provider.

Information at a point in time that a backup is taken can be exported (e.g., to secondary storage 324 of cloud management 302 or secondary storage 328 of other location 326) or stored (e.g., to secondary storage 320).

A data center storage system can be controlled by the provider. Volume identifiers (e.g., WWNs can be known by the provider and stored by the provider. Iterating through volumes and backing them up can be made to secondary storage (e.g., secondary storage 320). In some examples, backups can be performed using snapshots, or an architecture to back up directly from storage to secondary storage without intermediaries.

As depicted, data is stored directly on a local secondary storage, and it can be appreciated that the secondary can be located in other locations (e.g., secondary storage 324 or secondary storage 328). In addition, the storage can be replicated to a remote storage that is located on a provider cloud (e.g., secondary storage 324), another customer location (e.g., secondary storage 328), or another location separate from the customer's premises (e.g., secondary storage 328).

A storage system can provide an array-level snapshot of data on the array at a particular point in time, or a snapshot at a storage-group level or lower. Where multiple snapshots can be involved, the snapshots can be tagged so that they can be referred to collectively at approximately one point in time. Creating snapshots at a storage group level or higher can facilitate storage point in time consistency for virtual applications.

Figure 4:
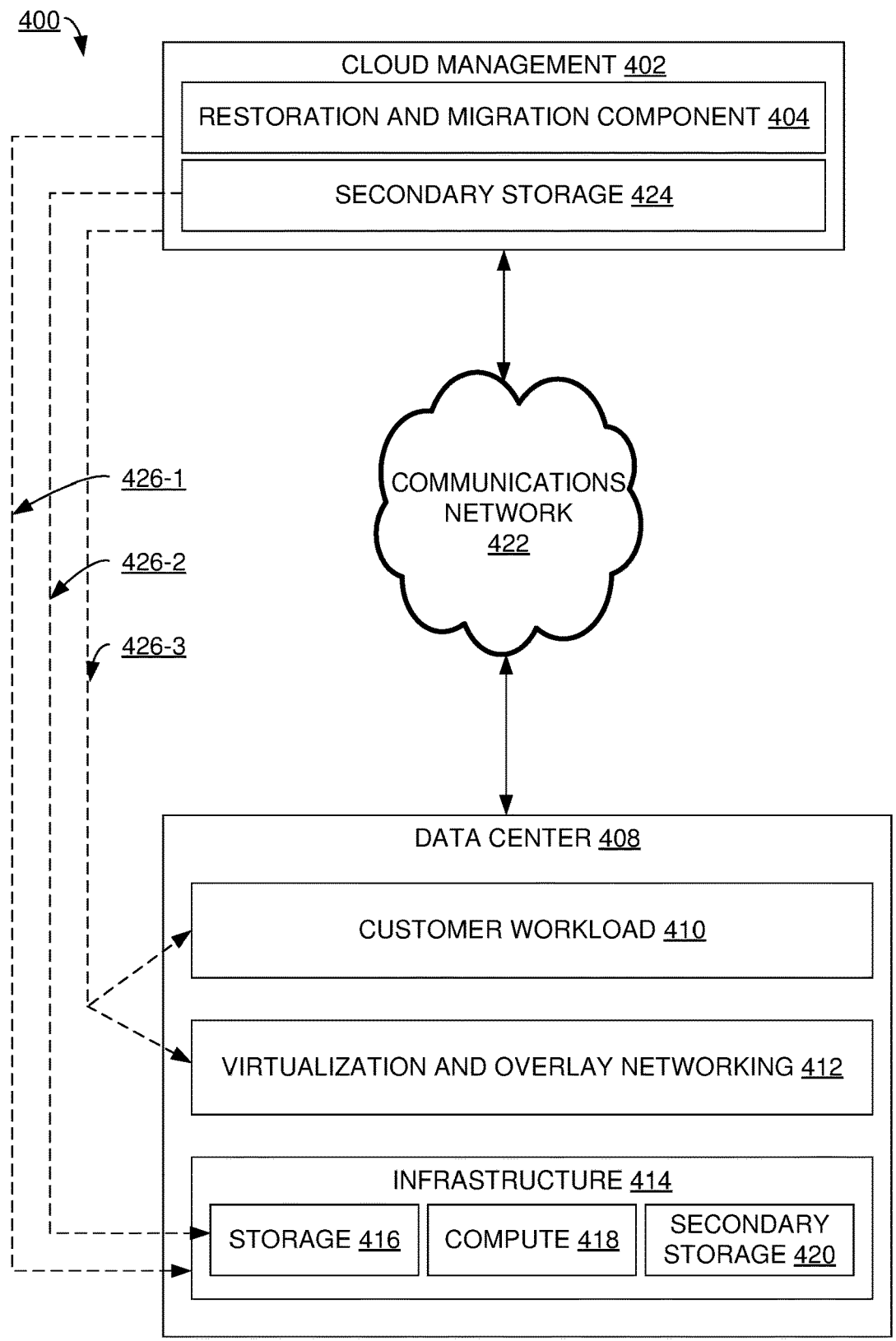
FIG. 4 illustrates an example system architecture for restoring a data center, and that can facilitate data center restoration and migration, in accordance with an embodiment of this disclosure.

FIG. 4 illustrates an example system architecture 400 for restoring a data center, and that can facilitate data center restoration, in accordance with an embodiment of this disclosure.

System architecture 400 comprises cloud management 402 (which can be similar to cloud management 102 of FIG. 1), data center 408 (which can be similar to data center 108), and communications network 422 (which can be similar to communications network 122).

In turn, cloud management 402 comprises restoration and migration component 404 (which can be similar to restoration and migration component 104) and secondary storage 424 (which can be similar to secondary storage 120, though located on cloud management 402 instead of data center 408). Data center 408 comprises customer workload 410, virtualization and overlay networking 412, and infrastructure 414 (which can be similar to customer workload 410, virtualization and overlay networking 112, and infrastructure 114, respectively). Infrastructure 414 comprises storage 416, compute 418, and secondary storage 420 (which can be similar to storage 116, compute 118, and secondary storage 120, respectively).

A data restoration can be performed as follows. Restoration of data can be to the original data center from which the data was originally protected, or can be to a new data center. When restoring a data center (e.g., data center 408), infrastructure can first be restored and configured (for an existing data center), or deployed and created (for a new data center). In some examples, data center infrastructure can be under provider control (e.g., control of cloud management 402), and the provider can know how to configure it (similar to described with respect to system architecture 100 of FIG. 1, and/or system architecture 200 of FIG. 2).

A data center restore operation can restore a customer's virtualized workload (e.g., customer workload 410) transparently, without a need for deep awareness of the virtualization technology and management. This can be accomplished as follows.

Infrastructure at a new location can be prepared using information that is managed by the provider (426-1). Data can be restored to storage (e.g., storage 416) (426-2). The system can be started up (426-3).

In some examples, this can function to restore data, because data center data, including virtualization management data is on the storage; because an overlay network allows network relocation of virtual entities as the overlay isolates the physical networking; and because storage WWN/ID spoofing can allow using the same storage IDs on a restore location.

When data is restored, virtualization management (e.g., part of virtualization and overlay networking 412) can also be restored, including configuration files and settings. Maintaining the same IDs and Internet Protocol (IP) addresses can mean that a virtualization layer is not aware that it has been restored to a different location. As such, it can be that there is no need to configure or re-register anything to the virtualization management.

Where IP addresses are the same, and a primary data center is active, networking IP collision with another data center can be handled as follows. The restored data center can be network isolated (sometimes referred to as a "network bubble") without access to the outside world. In other examples, scripting or tools can be used to Re-IP external fixed addresses that can collide.

A restore can be made to a latest point in time, or to a previous point in time. Matching point in time (PiT) data from storage and provider infrastructure information can be used. PiT data and more advanced versions of infrastructure can be used where there is not a strong dependency between the two, and where the recovered resources meet the amount needed for the PiT restore.

Previous PiTs recovery can be used for test, copy, reuse, and staging use cases.

Figure 5:
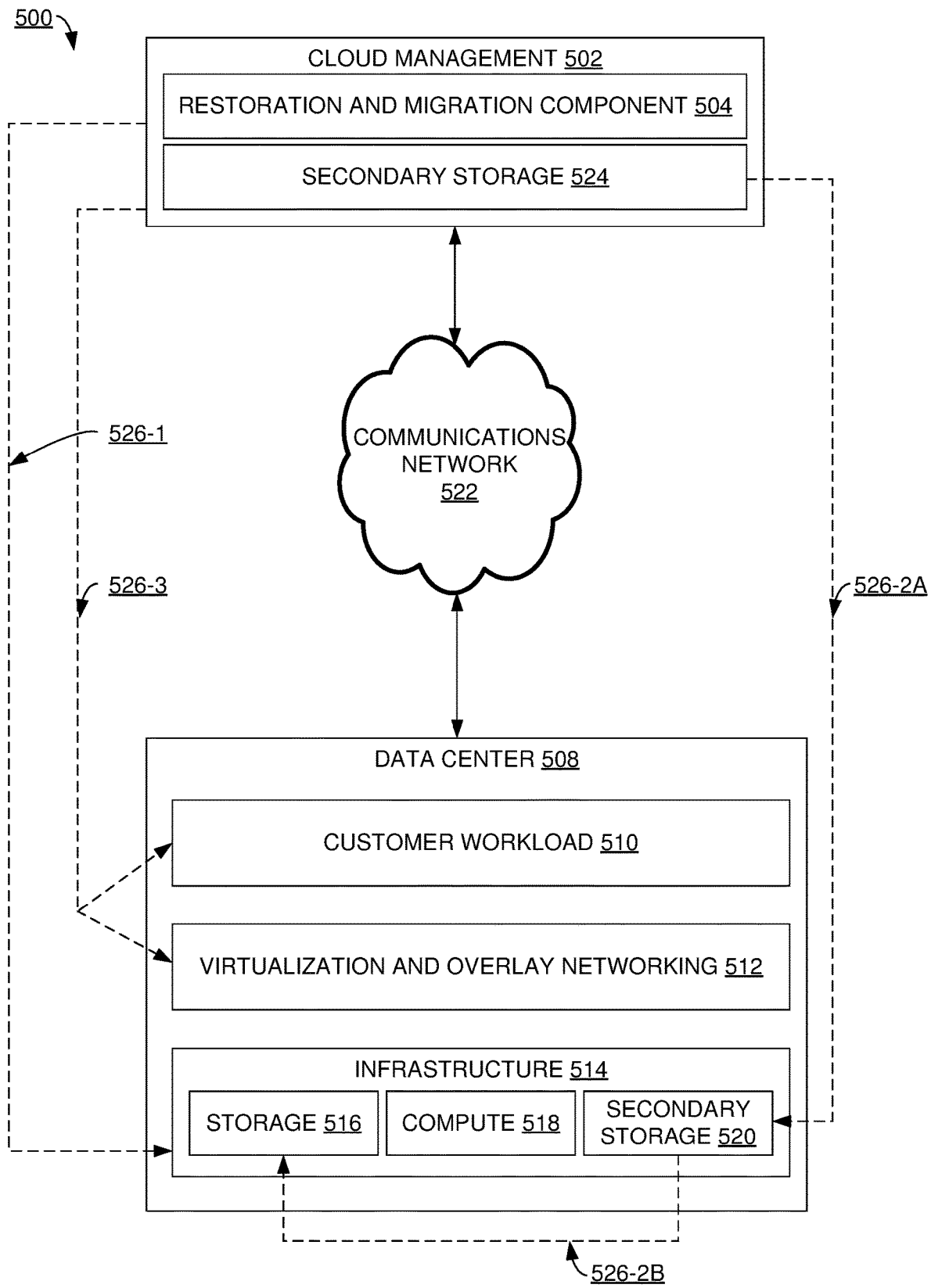
FIG. 5 illustrates another example system architecture for restoring a data center, and that can facilitate data center restoration and migration, in accordance with an embodiment of this disclosure.

FIG. 5 illustrates another example system architecture 500 for restoring a data center, and that can facilitate data center restoration, in accordance with an embodiment of this disclosure.

System architecture 500 comprises cloud management 502 (which can be similar to cloud management 102 of FIG. 1), data center 508 (which can be similar to data center 108), and communications network 522 (which can be similar to communications network 122).

In turn, cloud management 502 comprises restoration and migration component 504 (which can be similar to restoration and migration component 104) and secondary storage 524 (which can be similar to secondary storage 120, though located on cloud management 502 instead of data center 508). Data center 508 comprises customer workload 510, virtualization and overlay networking 512, and infrastructure 514 (which can be similar to customer workload 510, virtualization and overlay networking 112, and infrastructure 114, respectively). Infrastructure 514 comprises storage 516, compute 518, and secondary storage 520 (which can be similar to storage 116, compute 118, and secondary storage 120, respectively).

Compare to the restore in system architecture 400, a restore in system architecture 500 can travel through secondary storage 520. That is, in contrast to data being restored directly to storage in system architecture 400 (426-2), data can be restored to secondary storage 520 (526-2A), and from there to storage 516 (526-2B). Before restoring data to storage, infrastructure at a new location can be prepared using information that is managed by the provider (526-1, which can be similar to 426-1). After restoring data to storage, the system can be started up (526-3, which can be similar to 426-3).

Figure 6:
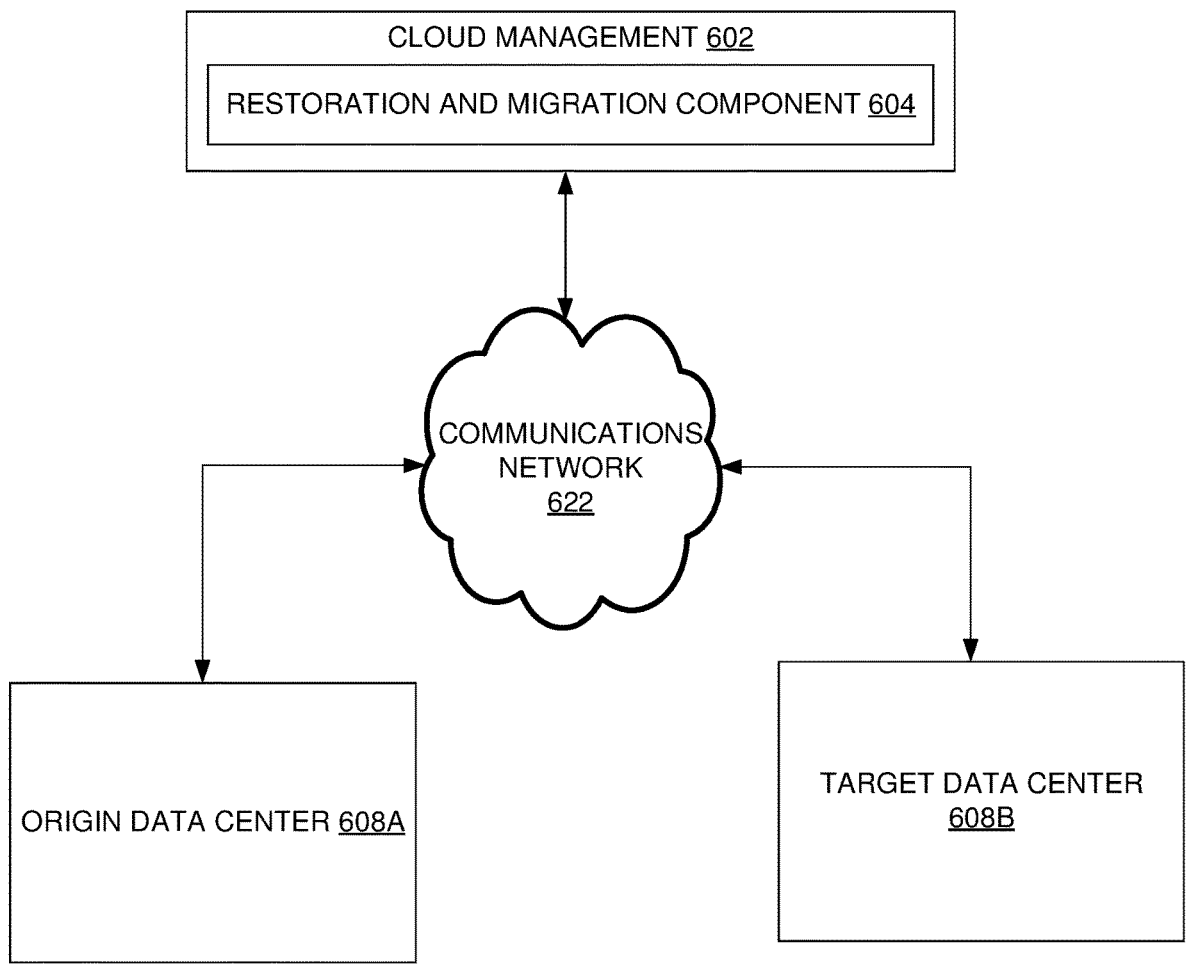
FIG. 6 illustrates an example system architecture for migrating a data center, and that can facilitate data center restoration and migration, in accordance with an embodiment of this disclosure.

FIG. 6 illustrates an example system architecture 600 for migrating a data center, and that can facilitate data center restoration and migration, in accordance with an embodiment of this disclosure.

System architecture 600 comprises cloud management 602 (which can be similar to cloud management 102 of FIG. 1), origin data center 608A and target data center 608B (which can each be similar to data center 108), and communications network 622 (which can be similar to communications network 122). In turn, cloud management 602 comprises restoration and migration component 604 (which can be similar to restoration and migration component 104).

In an IaaSaaS scenario, where a provider (e.g., cloud management 602) orchestrates full data centers, the provider can facilitate a full data center migration (e.g., from origin data center 608A and to target data center 608B) with little-to-no customer involvement. In some examples, migration can be performed with backup and restore constructs.

In some examples, a full migration can be effectuated as follows. Backup the data center (e.g., origin data center 608A) or use an existing backup (e.g., a latest backup). Restore the backup to a new location (e.g., target data center 608B). In some examples, the provider can orchestrate the infrastructure similar to as described with respect to system architecture 400 of FIG. 4 or system architecture 500 of FIG. 5. In some examples, a network bubble is not created, and Re-IP is not implemented, and workloads are not powered up.

In some examples, restoring the backup to a new location can take time to complete. To mitigate against data changes that occur during this time, another diff backup (e.g., a diff backup of origin data center 608A that reflects data changed on origin data center 608A since a previous backup was taken) can be taken during the restore, and changes in the diff can be applied to the new target site. Power down (or disconnect from a network) the origin site, and power up the new target site. In some examples, this can involve routing changes, based on network topology.

In some examples, powering up the target site before the origin site is disconnected or down can cause IP collisions.

In some examples, the provider has full control of the process, and therefore can facilitate migration without customer intervention. Where a switchover can be disruptive, a final switchover can be coordinated with the customer to occur at a preferred time. In some examples, the network on the target side can be temporarily isolated in order to test the site before performing the switchover, and handling any issues that are uncovered by running the isolated target side.

Figure 7:
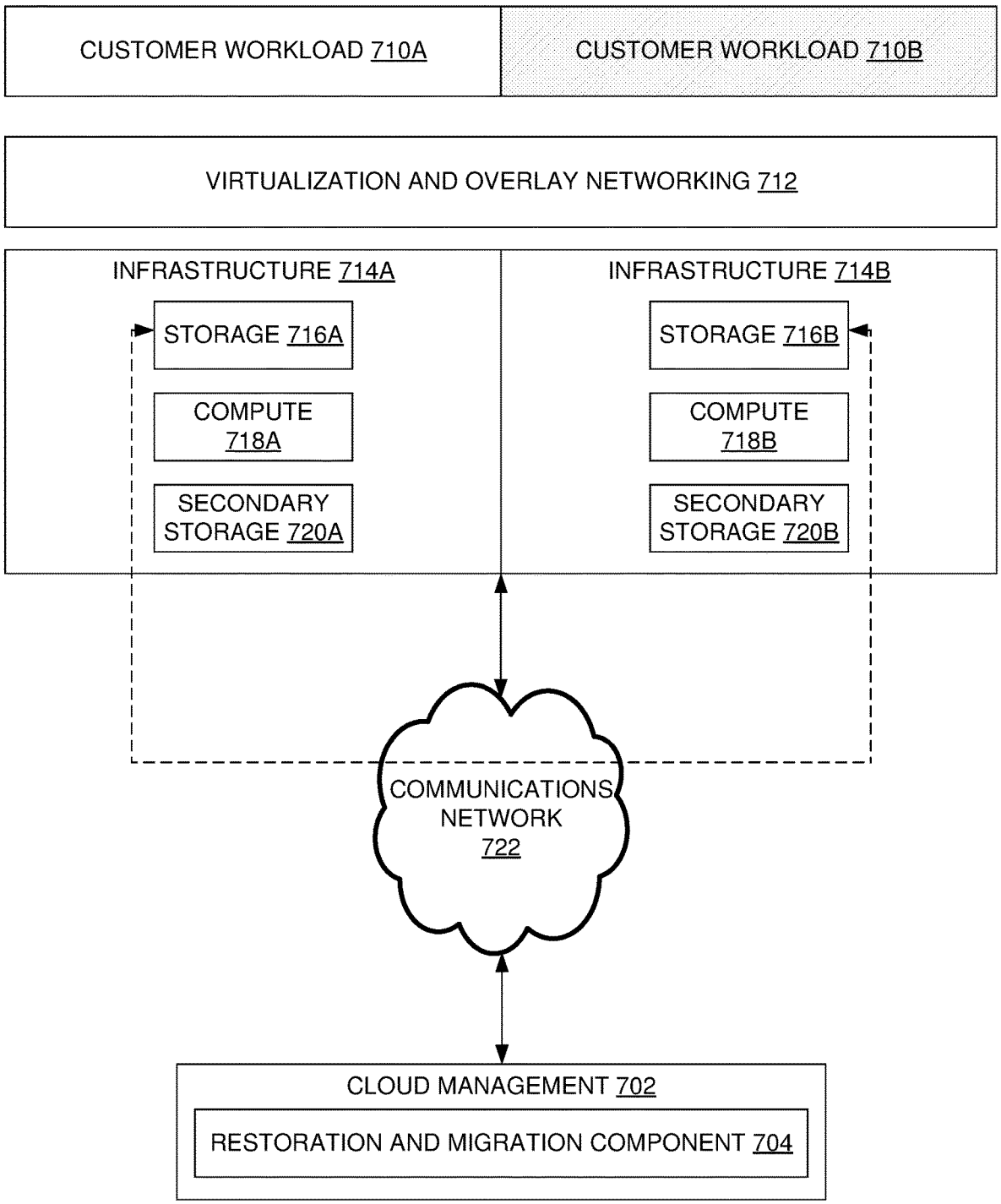
FIG. 7 illustrates an example system architecture for providing availability zones as a service, and that can facilitate data center restoration and migration, in accordance with an embodiment of this disclosure.

FIG. 7 illustrates an example system architecture 700 for providing availability zones as a service, and that can facilitate data center restoration and migration, in accordance with an embodiment of this disclosure.

System architecture 700 comprises cloud management 702 (which can be similar to cloud management 102 of FIG. 1), infrastructure 714A and infrastructure 714B (which can each be similar to infrastructure 114), virtualization and overlay networking 712 (which can be similar to virtualization and overlay networking 112), customer workload 710A and customer workload 710B (which can each be similar to customer workload 110), and communications network 722 (which can be similar to communications network 122).

In turn, cloud management 702 comprises restoration and migration component 704 (which can be similar to restoration and migration component 104). Infrastructure 714A comprises storage 716A, compute 718A, and secondary storage 720A (which can be similar to storage 116, compute 118, and secondary storage 120, respectively). Infrastructure 714B comprises storage 716B, compute 718B, and secondary storage 720B (which can be similar to storage 116, compute 118, and secondary storage 120, respectively).

Storage 716A and storage 716B can be configured in a mirroring configuration, where writes written to one storage are immediately and inline mirrored to the other. This configuration can mean that data in storage 716A and storage 716B can be identical (or mirrored). In some examples, technologies such as redundant array of inexpensive disks (RAID) 1, synchronous storage replicas, distributed storage volumes, synchronous clones, and active-active storage volumes can be used to implement mirroring between storage 716A and storage 716B.

As depicted, infrastructure 714A depicts an active availability zone that is executing customer workload 710A. Then, infrastructure 714B comprises a standby availability zone that is configured to execute customer workload 710B, but is not currently doing so. Where there is a failover (or otherwise a switch between availability zones), infrastructure 714B can begin executing customer workload 710B, while infrastructure 714A stops executing customer workload 710A. An availability zone can generally comprise a separate physical location (relative to a paired availability zone), with its own power and networking, so that should these resources fail for one availability zone, they can still be available at another availability zone.

An IaaSaaS offering can comprise a functionality to automatically create availability zones as a service (AZaaS). Availability zones can comprise (near) twin active/passive data centers that have data mirrored between them in real time. In a case of a service disruption in a main zone (e.g., infrastructure 714A), workloads can startup on the other availability zone (e.g., infrastructure 714B) and continue with little disruption.

An availability zone can be in a provider location, a third-party hosted location, or on another customer premise. In some examples, availability zones are within a low-latency distance of each other so that mirroring their data between the locations does not incur too high a latency.

In some examples, data is mirrored on both availability zone locations. Therefore, storage volume IDs can be identical in both locations. The network can comprise a stretched Layer 2 network, together with the overlay networking. A virtualization layer (e.g., virtualization and overlay networking 712) can span both locations, so that workloads (e.g., customer workload 710A and customer workload 710B) can shift from zone to zone without being configured to operate on the new zone.

Activation of an availability zone can be done by a high availability mechanism that powers up a workload at a correct location, and is managed by the provider. In some examples, a high availability mechanism can kick in regardless of cloud connectivity—e.g., using an on-premises orchestrator and independently of a provider's cloud.

In some examples, workloads run on one site (e.g., customer workload 710A on infrastructure 714A), which can allow costs associated with the other site to be reduced (when no workload is running).

Where the availability zone is in a hosting, provider, or shared location, and where adding compute to the cluster can be done quickly, resources can be shared (or over-provisioned) between customers to improve a cost ratio. In some examples, storage is not shared because the data is populated and mirrored live. In some examples, compute can mostly be powered down, and possibly shared between customers.

Example Process Flows

Figure 8:
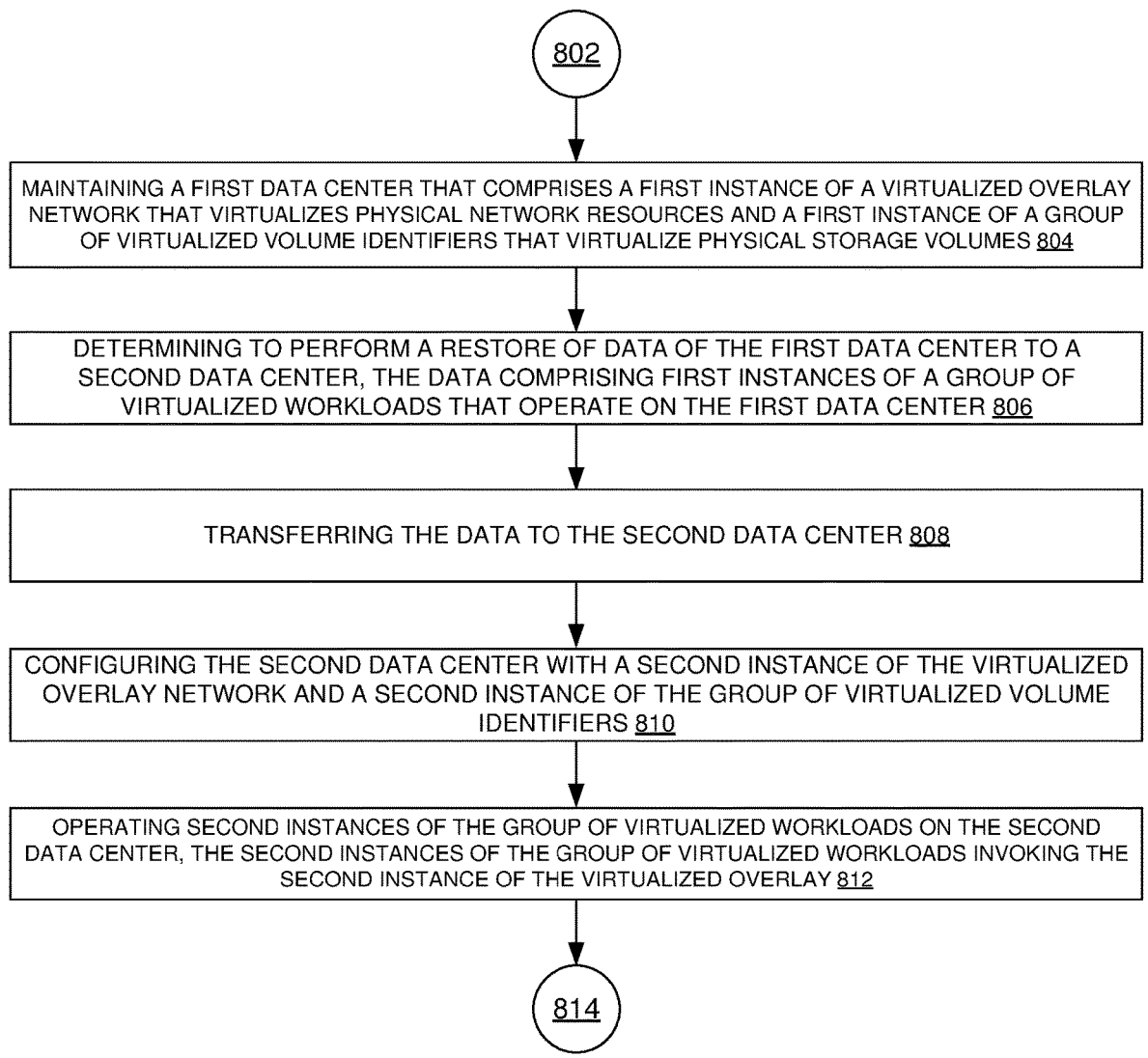
FIG. 8 illustrates an example process flow that can facilitate data center restoration and migration, in accordance with an embodiment of this disclosure.

FIG. 8 illustrates another example process flow that can facilitate data center restoration and migration, in accordance with an embodiment of this disclosure. In some examples, one or more embodiments of process flow 800 can be implemented by restoration and migration component 104 of FIG. 1, restoration and migration component 204 of FIG. 2, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, process flow 1000 of FIG. 10, and/or process flow 1100 of FIG. 11.

Process flow 800 begins with 802, and moves to operation 804. Operation 804 depicts maintaining a first data center that comprises a first instance of a virtualized overlay network that virtualizes physical network resources and a first instance of a group of virtualized volume identifiers that virtualize physical storage volumes. That is, the first data center can be similar to data center 108 of FIG. 1.

In some examples, a cloud platform stores information about the first instance of the virtualized overlay network and the first instance of the group of virtualized volume identifiers, and the cloud platform utilizes the stored information about the first instance of the virtualized overlay network and the first instance of the group of virtualized volume identifiers to configure the second data center. That is, cloud management 102 of FIG. 1 can store information about a data center's (e.g., data center 108) infrastructure, and this information can be used to migrate the data center.

After operation 804, process flow 800 moves to operation 806.

Operation 806 depicts determining to perform a restore of data of the first data center to a second data center, the data comprising first instances of a group of virtualized workloads that operate on the first data center. That is, a restore can be performed that is similar to that of system architecture 600 of FIG. 6.

After operation 806, process flow 800 moves to operation 808.

Operation 808 depicts transferring the data to the second data center. Transferring the data can be performed similar to the manner depicted in system architecture 400 of FIG. 4, or system architecture 500 of FIG. 5.

After operation 808, process flow 800 moves to operation 810.

Operation 810 depicts configuring the second data center with a second instance of the virtualized overlay network and a second instance of the group of virtualized volume identifiers. That is, the second data center can be configured to have the same virtualized overlay network as the first data center (which can be similar to virtualization and overlay networking 112 of FIG. 1).

In some examples, the second data center comprises a group of compute components that lack local storage, and the group of compute components boots from the group of compute components boots from a group of separate physical storage volumes on which the data is stored and that are referenced by the second instance of the group of virtualized volume identifiers. That is storage and compute can be separated (e.g., such as with storage 116 and compute 118 of FIG. 1), with storage storing the data. Where storage stores the data, copying the data from storage can be implemented to copy all of the data being stored.

In some examples, the first instance of the group of virtualized volume identifiers and the second instance of the group of virtualized volume identifiers present a same virtualized group of storage volumes while referencing respective different underlying physical storage volumes. That is virtual volumes can be the same on two data centers, even though the corresponding and underlying physical volumes can differ.

In some examples, an overlay network is configured after data is restored (or moved) to storage and a virtualization layer is running That is, an order can be that hardware infrastructure is deployed at a second site, data is restored to storage volumes, servers are booted to start virtualizing servers and providing a virtualization layer, and an overlay network is configured (which can be part of virtual infrastructure).

There can be a difference between migration and availability zones. With availability zones, data can be mirrored and a virtualization layer can be running and active right after an initial synchronization (in some examples, changes to virtualization volumes can be identified during a subsequent server reboot). With a migration, data can first be transferred so that virtualization has something to boot from.

After operation 810, process flow 800 moves to operation 812.

Operation 812 depicts operating second instances of the group of virtualized workloads on the second data center, the second instances of the group of virtualized workloads invoking the second instance of the virtualized overlay network and the second instance of the group of virtualized volume identifiers. That is, the restored second data center can be transparent to the virtualized workloads, which can operate on the first data center or the second data center without modification.

In some examples, operation 812 comprises disconnecting the first data center from a public communications network before performing the operating of the second instances of the group of virtualized workloads on the second data center. That is, a migration can be performed from one data center to another data center.

In some examples, the first data center is part of a first availability zone and the second data center is part of a second availability zone, a network of the first availability zone and the second availability zone comprises a stretched Layer 2 network that spans the first data center and the second data center, a virtualization layer of the first availability zone and the second availability zone spans the first data center and the second data center, and a high availability process utilizes a first orchestrator that is local to the first data center and a second orchestrator that is local to the second data center. That is, availability zones can be implemented similar to system architecture 700 of FIG. 7.

In some examples, the first instance of the virtualized overlay network and the second instance of the virtualized overlay network present a same virtualized overlay network while referencing respective different underlying physical network resources. That is, the virtualized overlay network on each data center can appear to be the same to a virtualized workload, so a virtualized workload can operate on either data center without modification.

After operation 812, process flow 800 moves to 814, where process flow 800 ends.

FIG. 9 illustrates another example process flow for data center restoration and migration, and that can facilitate data center restoration, in accordance with an embodiment of this disclosure. In some examples, one or more embodiments of process flow 900 can be implemented by restoration and migration component 104 of FIG. 1, restoration and migration component 204 of FIG. 2, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, process flow 1000 of FIG. 10, and/or process flow 1100 of FIG. 11.

Process flow 900 begins with 902, and moves to operation 904. Operation 904 depicts determining to transfer data of a first data center to a second data center, wherein the data comprises first instances of a group of virtualized workloads that operate on the first data center, and wherein the first data center comprises a first instance of a virtualized overlay network that abstracts physical network resources and a first instance of a group of virtualized volume identifiers that abstract physical storage volumes. In some examples, operation 904 can be implemented in a similar manner as operations 804-806 of FIG. 8.

In some examples, a first virtualized volume identifier of the virtualized volume identifiers references a first physical storage device of the first data center having a first physical identifier, wherein the first virtualized volume identifier references a second physical storage device of the second data center having a second physical identifier, and wherein the first physical identifier differs from the second physical identifier.

In some examples, a first virtual network address of the first virtualized overlay network references different physical network addresses on the first instance of the virtualized overlay network and on the second instance of the virtualized overlay network.

In some examples, the data comprises virtualization management data that supports operation of the group of virtualized workloads. That is, virtual management data can be migrated because it is part of the data stored in storage.

In some examples, the first instance of the group of virtualized volume identifiers that abstract physical storage volumes spoofs the physical storage volumes. That is, virtualizing volumes can involve spoofing.

After operation 904, process flow 900 moves to operation 906.

Operation 906 depicts transferring the data to the second data center, wherein the data on the second data center utilizes the second instance of the virtualized overlay network and the second instance of the group of virtualized volume identifiers. In some examples, operation 906 can be implemented in a similar manner as operation 808 of FIG. 8.

In some examples, operation 906 comprises transferring the data from storage of a cloud platform to the second data center. That is, data can be transferred similar to 426-2 of FIG. 4.

In some examples, operation 906 transferring the data from storage of a cloud platform to a secondary storage of the second data center, and then to primary storage resources from which the virtualized workloads operate. That is, data can be transferred similar to 526-2A and 526-2B of FIG. 5.

After operation 906, process flow 900 moves to operation 908.

Operation 908 depicts configuring the second data center with a second instance of the virtualized overlay network and a second instance of the group of virtualized volume identifiers. In some examples, operation 908 can be implemented in a similar manner as operation 810 of FIG. 8.

After operation 908, process flow 900 moves to operation 910.

Operation 910 depicts operating second instances of the group of virtualized workloads on the second data center, the second instances of the group of virtualized workloads invoking the second instance of the virtualized overlay network and the second instance of the group of virtualized volume identifiers. In some examples, operation 910 can be implemented in a similar manner as operation 812 of FIG. 8.

After operation 910, process flow 900 moves to 912, where process flow 900 ends.

Figure 10:
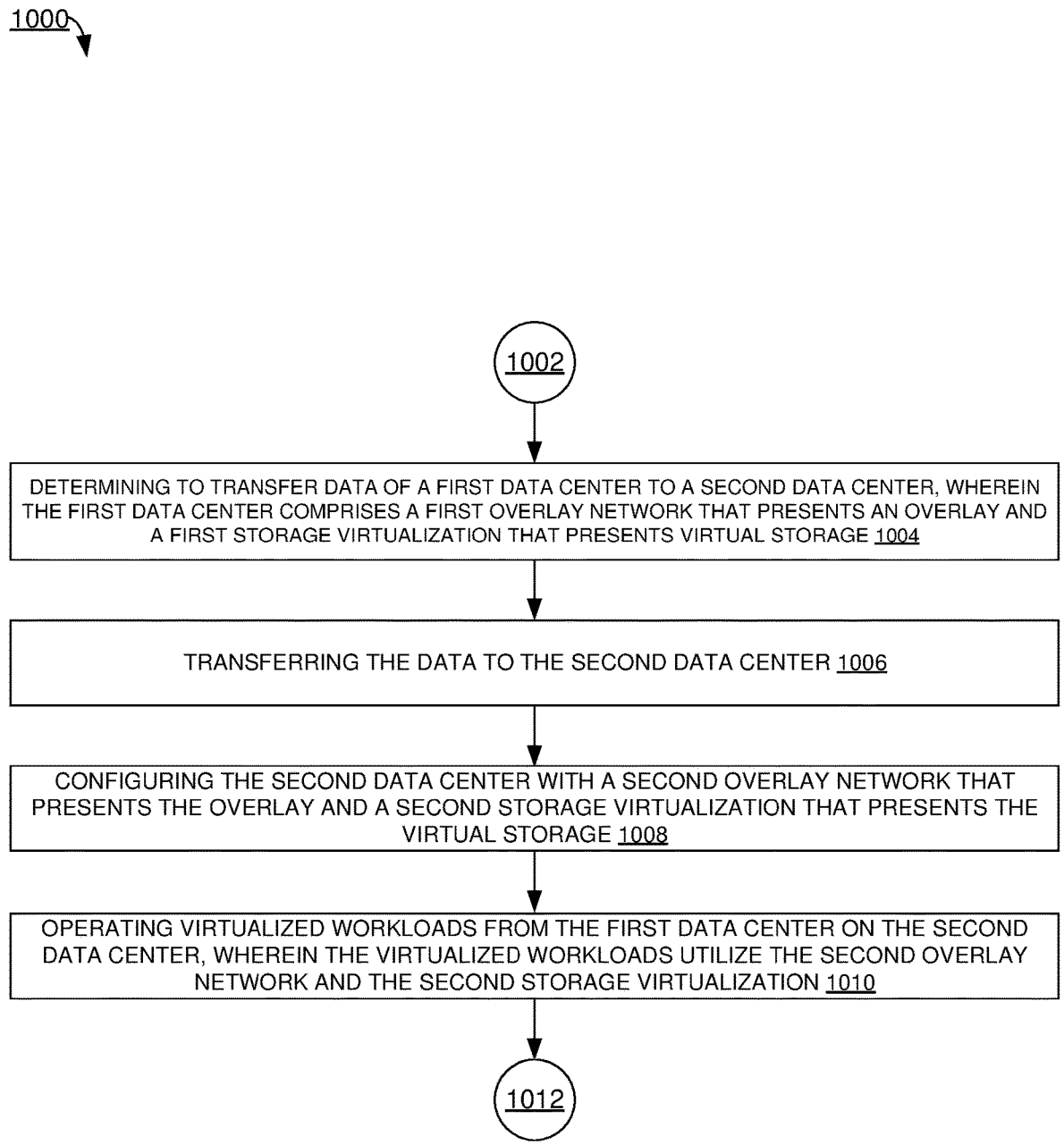
FIG. 10 illustrates another example process flow that can facilitate data center restoration and migration, in accordance with an embodiment of this disclosure.

FIG. 10 illustrates another example process flow for data center restoration and migration, and that can facilitate data center restoration, in accordance with an embodiment of this disclosure. In some examples, one or more embodiments of process flow 1000 can be implemented by restoration and migration component 104 of FIG. 1, restoration and migration component 204 of FIG. 2, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, process flow 900 of FIG. 9, and/or process flow 1100 of FIG. 11.

Process flow 1000 begins with 1002, and moves to operation 1004. Operation 1004 depicts determining to transfer data of a first data center to a second data center, wherein the first data center comprises a first overlay network that presents an overlay and a first storage virtualization that presents virtual storage. In some examples, operation 1004 can be implemented in a similar manner as operations 804-806 of FIG. 8.

In some examples, the data is first data, the first data is from a first point in time, second data is from a second point in time, and the second point in time is newer than the first point in time. In such examples, operation 1004 can comprise determining to use, in a cloud platform that stores information about the first overlay network and the first storage virtualization, information about the first overlay network and the first storage virtualization that corresponds to the second point in time based on determining that the information about the first overlay network and the first storage virtualization that corresponds to the second point in time is associated with at least an amount of resources identified for executing the first data from the first point in time. That is, a restoration is made using newer infrastructure than the data being restored, this can be done where the resources recovered are at least the amount needed for the point in time restore.

In some examples, a cloud platform manages the first data center, and wherein the cloud platform manages the second data center. That is, a cloud platform manage multiple data centers, such as cloud management 102 of FIG. 1 managing data centers 106.

In some examples, the first storage virtualization comprises a virtualization of a world wide name of a physical storage volume.

After operation 1004, process flow 1000 moves to operation 1006.

Operation 1006 depicts transferring the data to the second data center, wherein the data on the second data center utilizes the second overlay network and the second storage virtualization. In some examples, operation 1006 can be implemented in a similar manner as 808 of FIG. 8.

In some examples, a cloud platform stores identifiers of physical storage volumes of the first data center. In such examples, operation 1006 can comprise iterating, by the cloud platform, through the physical storage volumes using identifiers of the physical storage volumes, and copying respective data stored on the physical storage volumes. That is, a backup can be performed by iterating through volumes, and backing up each volume.

After operation 1006, process flow 1000 moves to operation 1008.

Operation 1008 depicts configuring the second data center with a second overlay network that presents the overlay and a second storage virtualization that presents the virtual storage. In some examples, operation 1008 can be implemented in a similar manner as 810 of FIG. 8.

After operation 1008, process flow 1000 moves to operation 1010.

Operation 1010 depicts operating virtualized workloads from the first data center on the second data center, wherein the virtualized workloads utilize the second overlay network and the second storage virtualization. In some examples, operation 1010 can be implemented in a similar manner as 812 of FIG. 8.

After operation 1010, process flow 1000 moves to 1012, where process flow 1000 ends.

FIG. 11 illustrates an example process flow for restoring to a point in time, and that can facilitate data center restoration and migration, in accordance with an embodiment of this disclosure. In some examples, one or more embodiments of process flow 1000 can be implemented by restoration and migration component 104 of FIG. 1, restoration and migration component 204 of FIG. 2, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 800 of FIG. 8, process flow 900 of FIG. 9, and/or process flow 1000 of FIG. 10.

Process flow 1100 can be implemented to restore to a point in time, and use infrastructure data for that point in time to configure the second data center. That is, there can be examples where the first data is from a first point in time, where second data is from a second point in time, and where the second point in time is newer than the first point in time. In some examples, process flow 1100 can be implemented for a migration. It can be that, in an availability zone example, the availability zones use mirroring and so the availability zones each have the latest data.

Process flow 1100 begins with 1102, and moves to operation 1104. Operation 1104 depicts identifying, in a cloud platform that stores information about a first overlay network and a first storage virtualization, first information about the first overlay network and the first storage virtualization that corresponds to a first point in time. That is, infrastructure information for the first point in time can be determined. In some examples, this information can be maintained by a cloud platform that manages the data centers, such as cloud management 102.

After operation 1104, process flow 1100 moves to operation 1106.

Operation 1106 depicts utilizing the first information about the first overlay network and the first storage virtualization that corresponds to the first point in time to configure the second data center. That is, a cloud platform (e.g., cloud management 602) can use this information to configure a target data center (e.g., target data center 608B).

After operation 1106, process flow 1100 moves to operation 1108.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of cloud management 102, data centers 106, and/or data center 108 of FIG. 1, and/or cloud management 202, data centers 206, and/or data center 208 of FIG. 2.

In some examples, computing environment 1200 can implement one or more embodiments of the process flows of FIGS. 8-11 to facilitate data center restoration and migration.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multiprocessor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s)

1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      maintaining a first data center that comprises a first instance of a virtualized overlay network that virtualizes physical network resources and a first instance of a group of virtualized volume identifiers that virtualize a first group of physical storage volumes of the first data center;
      determining to perform a restore of data of the first data center to a second data center, the data comprising first instances of a group of virtualized workloads that operate on the first data center;
      transferring the data to the second data center;
      based on the determining to perform the restore, configuring the second data center with a second instance of the virtualized overlay network and a second instance of the group of virtualized volume identifiers,
         wherein configuring the second data center comprises associating respective virtualized volume identifiers of the group of virtualized volume identifiers from the first data center with respective second physical storage volumes of a second group of physical storage volumes of the second data center, and
         wherein the configuring is performed based on information about the group of virtualized volume identifiers stored in a cloud platform that is separate from the first data center and the second data center; and
      operating second instances of the group of virtualized workloads on the second data center, the second instances of the group of virtualized workloads invoking the second instance of the virtualized overlay network and the second instance of the group of virtualized volume identifiers.

2. The system of claim 1, wherein the operations further comprise:
   disconnecting the first data center from a public communications network before performing the operating of the second instances of the group of virtualized workloads on the second data center.

3. The system of claim 1, wherein the first data center is part of a first availability zone and the second data center is part of a second availability zone, wherein a network of the first availability zone and the second availability zone comprises a stretched Layer 2 network that spans the first data center and the second data center, wherein a virtualization layer of the first availability zone and the second availability zone spans the first data center and the second data center, and wherein a high availability process utilizes a first orchestrator that is local to the first data center and a second orchestrator that is local to the second data center.

4. The system of claim 1, wherein the first instance of the virtualized overlay network and the second instance of the virtualized overlay network present a same virtualized overlay network while referencing respective different underlying physical network resources.

5. The system of claim 1, wherein the second data center comprises a group of compute components that lack local storage, and wherein the group of compute components boots from a group of separate physical storage volumes on which the data is stored and that are referenced by the second instance of the group of virtualized volume identifiers.

6. The system of claim 1, wherein the cloud platform stores information about the first instance of the virtualized overlay network, and wherein the cloud platform utilizes the stored information about the first instance of the virtualized overlay network to configure the second data center.

7. The system of claim 1, wherein the first instance of the group of virtualized volume identifiers and the second instance of the group of virtualized volume identifiers present a same virtualized group of storage volumes while referencing respective different underlying physical storage volumes.

8. A method, comprising:
   determining, by a system comprising a processor, to transfer data of a first data center to a second data center, wherein the data comprises first instances of a group of virtualized workloads that operate on the first data center, and wherein the first data center comprises a first instance of a virtualized overlay network that abstracts physical network resources and a first instance of a group of virtualized volume identifiers that abstract physical storage volumes of the first data center;
   transferring, by the system, the data to the second data center;
   configuring, by the system, the second data center with a second instance of the virtualized overlay network and a second instance of the group of virtualized volume identifiers wherein configuring the second data center comprises associating respective virtualized volume identifiers of the group of virtualized volume identifiers from the first data center with respective second physical storage volumes of a second group of physical storage volumes of the second data center; and
   operating, by the system, second instances of the group of virtualized workloads on the second data center, the second instances of the group of virtualized workloads invoking the second instance of the virtualized overlay network and the second instance of the group of virtualized volume identifiers.

9. The method of claim 8, wherein the transferring of the data to the second data center comprises:
   transferring the data from storage of a cloud platform to the second data center.

10. The method of claim 8, wherein the transferring of the data to the second data center comprises:

transferring the data from storage of a cloud platform to a secondary storage of the second data center, and then to primary storage resources from which the virtualized workloads operate.

11. The method of claim 8, wherein a first virtualized volume identifier of the virtualized volume identifiers references a first physical storage device of the first data center having a first physical identifier, wherein the first virtualized volume identifier references a second physical storage device of the second data center having a second physical identifier, and wherein the first physical identifier differs from the second physical identifier.

12. The method of claim 8, wherein a first virtual network address of the virtualized overlay network references different physical network addresses on the first instance of the virtualized overlay network and on the second instance of the virtualized overlay network.

13. The method of claim 8, wherein the data comprises virtualization management data that supports operation of the group of virtualized workloads.

14. The method of claim 8, wherein the first instance of the group of virtualized volume identifiers that abstract physical storage volumes spoofs the physical storage volumes.

15. A non-transitory computer-readable medium comprising instructions that, in response to execution, cause a system comprising a processor to perform operations, comprising: determining to transfer data of a first data center to a second data center, wherein the first data center comprises a first overlay network that presents an overlay and a first storage virtualization that presents virtual storage of first physical storage of the first data center; transferring the data to the second data center; configuring the second data center with a second overlay network that presents the overlay and a second storage virtualization that presents the virtual storage relative to second physical storage of the second data center, wherein configuring the second data center comprises associating respective virtualized volume identifiers of a group of virtualized volume identifiers with respective second physical storage volumes of a second group of physical storage volumes of the second data center; and operating virtualized workloads from the first data center on the second data center, wherein the virtualized workloads utilize the second overlay network and the second storage virtualization.

16. The non-transitory computer-readable medium of claim 15, wherein the data is first data, wherein the first data is from a first point in time, wherein second data is from a second point in time, wherein the second point in time is newer than the first point in time, and wherein the operations further comprise:
identifying, in a cloud platform that stores information about the first overlay network and the first storage virtualization, first information about the first overlay network and the first storage virtualization that corresponds to the first point in time; and
utilizing the first information about the first overlay network and the first storage virtualization that corresponds to the first point in time to configure the second data center.

17. The non-transitory computer-readable medium of claim 15, wherein the data is first data, wherein the first data is from a first point in time, wherein second data is from a second point in time, wherein the second point in time is newer than the first point in time, and wherein the operations further comprise:
determining to use, in a cloud platform that stores information about the first overlay network and the first storage virtualization, information about the first overlay network and the first storage virtualization that corresponds to the second point in time based on determining that the information about the first overlay network and the first storage virtualization that corresponds to the second point in time is associated with at least an amount of resources identified for executing the first data from the first point in time.

18. The non-transitory computer-readable medium of claim 15, wherein a cloud platform stores identifiers of physical storage volumes of the first data center, and wherein the transferring of the data to the second data center comprises:
iterating, by the cloud platform, through the physical storage volumes using identifiers of the physical storage volumes, and copying respective data stored on the physical storage volumes.

19. The non-transitory computer-readable medium of claim 15, wherein a cloud platform manages the first data center, and wherein the cloud platform manages the second data center.

20. The non-transitory computer-readable medium of claim 15, wherein the first storage virtualization comprises a virtualization of a world wide name of a physical storage volume.

* * * * *